(12) United States Patent
Bardagjy et al.

(10) Patent No.: US 10,586,342 B2
(45) Date of Patent: Mar. 10, 2020

(54) SHIFTING DIFFRACTIVE OPTICAL ELEMENT FOR ADJUSTABLE DEPTH SENSING RESOLUTION

(71) Applicant: Facebook Technologies, LLC, Menlo Park, CA (US)

(72) Inventors: Andrew Matthew Bardagjy, Fremont, CA (US); Joseph Duggan, San Francisco, CA (US); Cina Hazegh, Walnut Creek, CA (US); Fei Liu, San Jose, CA (US); Mark Timothy Sullivan, Mountain View, CA (US); Simon Morris Shand Weiss, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 372 days.

(21) Appl. No.: 15/693,297

(22) Filed: Aug. 31, 2017

(65) Prior Publication Data

US 2019/0066316 A1 Feb. 28, 2019

(51) Int. Cl.
*G06T 7/521* (2017.01)
*G02B 27/01* (2006.01)
*G02B 26/08* (2006.01)
*G02B 27/42* (2006.01)
*H04N 5/225* (2006.01)
*G02B 27/30* (2006.01)

(52) U.S. Cl.
CPC .......... *G06T 7/521* (2017.01); *G02B 26/0808* (2013.01); *G02B 27/0172* (2013.01);
(Continued)

(58) Field of Classification Search
CPC .. H04N 5/2256; H04N 5/2226; H04N 5/2354; G06T 7/0051; G06T 2207/10152; G06F 3/011; G02B 27/425; G01S 17/89
See application file for complete search history.

(56) References Cited

U.S. PATENT DOCUMENTS

2013/0038881 A1 2/2013 Pesach et al.
2015/0309263 A2 10/2015 Abovitz et al.
(Continued)

FOREIGN PATENT DOCUMENTS

WO WO 2015/192117 A1 12/2015

OTHER PUBLICATIONS

United States Office Action, U.S. Appl. No. 15/676,717, dated Jul. 10, 2019, 8 pages.
(Continued)

*Primary Examiner* — Luke D Ratcliffe
(74) *Attorney, Agent, or Firm* — Fenwick & West LLP

(57) ABSTRACT

A depth camera assembly for depth sensing of a local area includes a structured light generator, an imaging device, and a controller. The structured light generator illuminates a local area with structured light and includes an illumination source, a mounting element, and a diffractive optical element (DOE) mounted on the mounting element. The mounting element can have a plurality of adjustable positions relative to the illumination source based on emission instructions from the controller. The DOE generates, using light emitted from the illumination source, diffracted scanning beams that are projected as the structured light into the local area. A pattern of the structured light is dynamically adjustable and unique for each adjustable position of the mounting element. The imaging device captures image(s) of the structured light reflected from object(s) in the local area. The controller determines depth information for the object(s) based in part on the captured image(s).

20 Claims, 5 Drawing Sheets

(52) U.S. Cl.
CPC ....... *G02B 27/0176* (2013.01); *G02B 27/425* (2013.01); *H04N 5/2256* (2013.01); *G02B 27/30* (2013.01); *G02B 2027/014* (2013.01); *G02B 2027/0138* (2013.01); *G02B 2027/0154* (2013.01); *G06T 2207/10016* (2013.01); *G06T 2207/10028* (2013.01); *G06T 2207/10152* (2013.01)

(56) References Cited

U.S. PATENT DOCUMENTS

| | | |
|---|---|---|
| 2016/0223828 A1 | 8/2016 | Abraham et al. |
| 2016/0274679 A1 | 9/2016 | Romano et al. |
| 2017/0124928 A1 | 5/2017 | Edwin et al. |
| 2017/0192499 A1 | 7/2017 | Trail |
| 2017/0195653 A1 | 7/2017 | Trail et al. |
| 2018/0010907 A1* | 1/2018 | Forster ............... G01B 11/2513 |
| 2018/0063390 A1* | 3/2018 | Trail ................... H04N 5/2256 |

OTHER PUBLICATIONS

Extended European Search Report, European Application No. 18188682.1, dated Jan. 2, 2019.
PCT International Search Report and Written Opinion, PCT Application No. PCT/US2018/045407, dated Nov. 26, 2018, 24 pages.

\* cited by examiner

SHIFTING DIFFRACTIVE OPTICAL ELEMENT FOR ADJUSTABLE DEPTH SENSING RESOLUTION

BACKGROUND

The present disclosure generally relates to depth sensing, and specifically relates to a shifting diffractive optical element for achieving an adjustable resolution of a structured light pattern for three-dimensional depth sensing.

To achieve a compelling user experience for depth sensing when using head-mounted displays (HMDs), it is important to create a scanning device that provides illumination pattern that is dynamically adjustable in real time. Most depth sensing methods rely on active illumination and detection. The conventional methods for depth sensing involve mechanical scanning or fixed diffractive-optics pattern projection, using structured light or time-of-flight techniques. Depth sensing based on time-of-flight uses a mechanical based mirror device (scanner) to send short pulses into an object space. The depth sensing based on time-of-flight further uses a high-speed detector to time-gate back-scattered light from the object to create high resolution depth maps. However, the mechanical based scanner performs inadequately in scanning speed, real-time reconfiguration and mechanical stability. Depth sensing based on a fixed structured light uses a diffractive optical element to generate a structured light of a static (fixed) pattern projected into an object space. The depth sensing based on the fixed structured light further uses a pre-stored look-up table to compute and extract depth maps. However, the depth sensing based on the fixed structured light is not robust enough for dynamic depth sensing where the adjustment in spatial resolution of an illumination pattern is required.

SUMMARY

A depth camera assembly (DCA) determines depth information associated with one or more objects in a local area. The DCA comprises a structured light generator, an imaging device and a controller. The structured light generator is configured to illuminate a local area with structured light in accordance with emission instructions. The structured light generator includes an illumination source, a mounting element, a diffractive optical element (DOE), and a projection assembly. The illumination source is configured to emit one or more pulses of light based in part on the emission instructions. The mounting element is configured to have a plurality of adjustable positions relative to the illumination source based in part on the emission instructions. The DOE is mounted on the mounting element and generates diffracted scanning beams from the one or more pulses of light, the diffracted scanning beams having a different pattern for each position of the mounting element of the plurality of adjustable positions. The projection assembly is configured to project the diffracted scanning beams as the structured light into the local area. A pattern of the structured light is dynamically adjustable based in part on an adjustable position of the mounting element of the plurality of adjustable positions. The imaging device captures one or more images of at least a portion of the structured light reflected from the one or more objects in the local area. The controller generates the emission instructions and provides the emission instructions to the structured light generator. The controller further determines depth information for the one or more objects based in part on the captured one or more images.

A head-mounted display (HMD) can further integrate the DCA. The HMD further includes an electronic display and an optical assembly. The HMD may be, e.g., a virtual reality (VR) system, an augmented reality (AR) system, a mixed reality (MR) system, or some combination thereof. The electronic display is configured to emit image light. The optical assembly is configured to direct the image light to an eye-box of the HMD corresponding to a location of a user's eye, the image light comprising the depth information of the one or more objects in the local area determined by the DCA.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A depth camera assembly (DCA) for determining depth information of one or more objects in a local area surrounding some or all of the DCA is presented herein. The DCA includes a structured light generator, an imaging device (camera), and a controller. The structured light generator includes a diffractive optical element (DOE), a DOE mount, and an illumination source. The DOE mount is configured to have a plurality of different positions relative to the illumination source. The DOE mount can be synchronized (e.g., via the controller) with the illumination source such that the DOE mount positions the DOE in different positions for different pulses of light emitted from the illumination source. Each position of the DOE results in a different pattern of structured light emitted from the structured light generator that illuminates the local area.

Adjusting a position of the DOE (e.g., via the DOE mount) provides an adjustable resolution of the structured light pattern. Furthermore, adjusting the position of the DOE results into a steerable pattern of the emitted structured light. For example, a field-of-view covered by the emitted structured light can vary by adjusting the position of the DOE. Also, the structured light can be pointed at a particular object in the local area by adjusting the position of the DOE. The pattern of the structured light can be modified by adjusting the position of the DOE for different applications, e.g., near sensing vs. far sensing, object scanning vs. room or building scanning vs. hand tracking, etc.

The imaging device of the DCA captures one or more images of at least a portion of the structured light reflected from the one or more objects in the local area. The controller determines depth information for the one or more objects based in part on the captured one or more images.

In some embodiments, the DCA is integrated into a head-mounted display (HMD) that captures data describing depth information in a local area surrounding some or all of the HMD. The HMD may be part of, e.g., a virtual reality (VR) system, an augmented reality (AR) system, a mixed reality (MR) system, or some combination thereof. The HMD further includes an electronic display and an optical assembly. The electronic display is configured to emit image light. The optical assembly is configured to direct the image light to an eye-box of the HMD corresponding to a location of a user's eye, the image light comprising the depth information of the one or more objects in the local area determined by the DCA.

Figure 1:
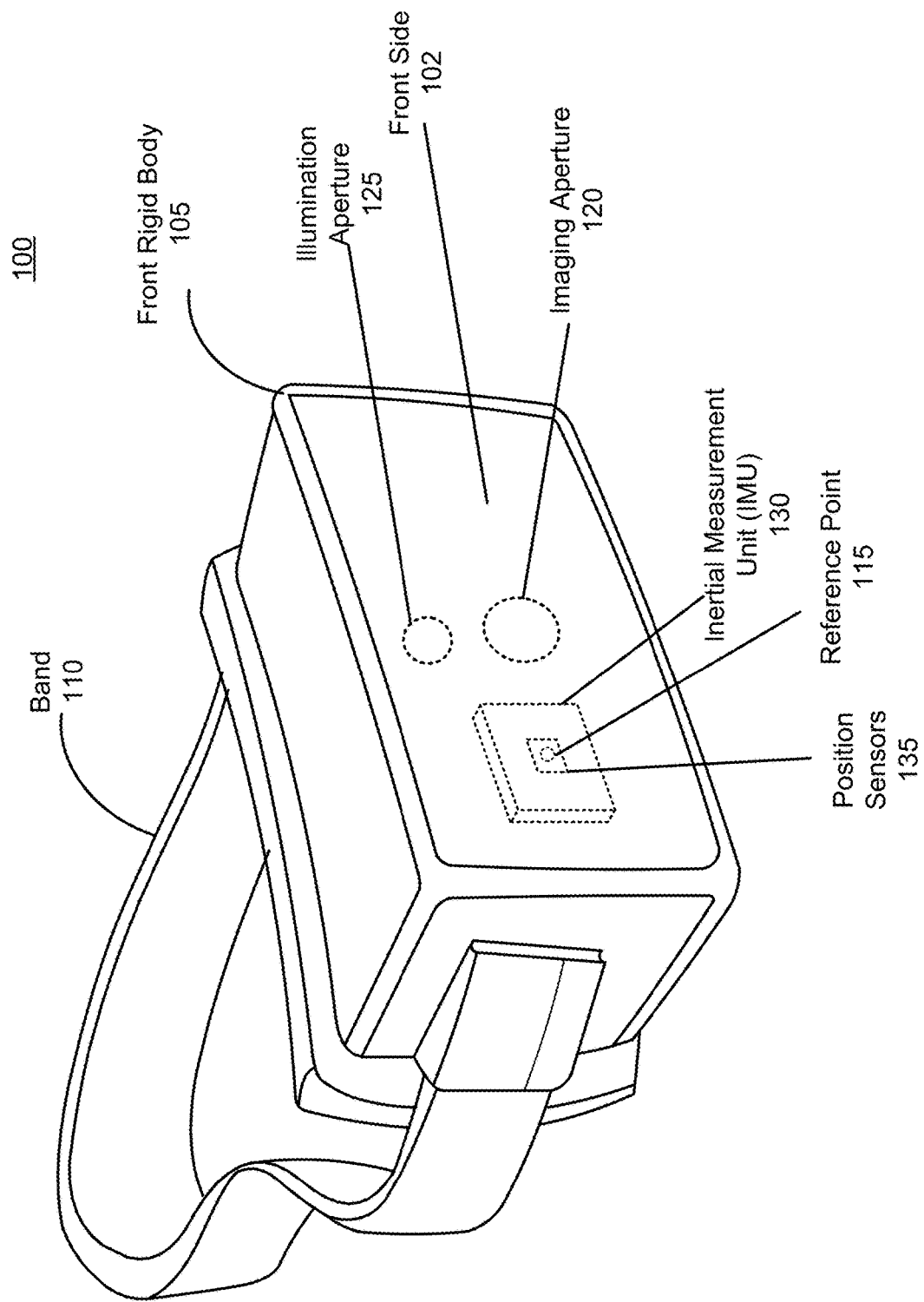
FIG. 1 is a diagram of a head-mounted display (HMD), in accordance with an embodiment.

FIG. 1 is a diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. The HMD 100 also includes a DCA configured to determine depth information of a local area surrounding some or all of the HMD 100. The HMD 100 also includes an imaging aperture 120 and an illumination aperture 125, and an illumination source of the DCA emits light (e.g., structured light of an adjustable pattern) through the illumination aperture 125. An imaging device of the DCA captures light from the illumination source that is reflected from the local area through the imaging aperture 120. Light emitted from the illumination source of the DCA through the illumination aperture 125 comprises structured light, as discussed in more detail in conjunction with FIGS. 2-4. Light reflected from the local area through the imaging aperture 120 and captured by the imaging device of the DCA comprises at least a portion of the reflected structured light, as also discussed in more detail in conjunction with FIGS. 2-4.

The front rigid body 105 includes one or more electronic display elements (not shown in FIG. 1), one or more integrated eye tracking systems (not shown in FIG. 1), an Inertial Measurement Unit (IMU) 130, one or more position sensors 135, and the reference point 115. In the embodiment shown by FIG. 1, the position sensors 135 are located within the IMU 130, and neither the IMU 130 nor the position sensors 135 are visible to a user of the HMD 100. The IMU 130 is an electronic device that generates fast calibration data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 2:
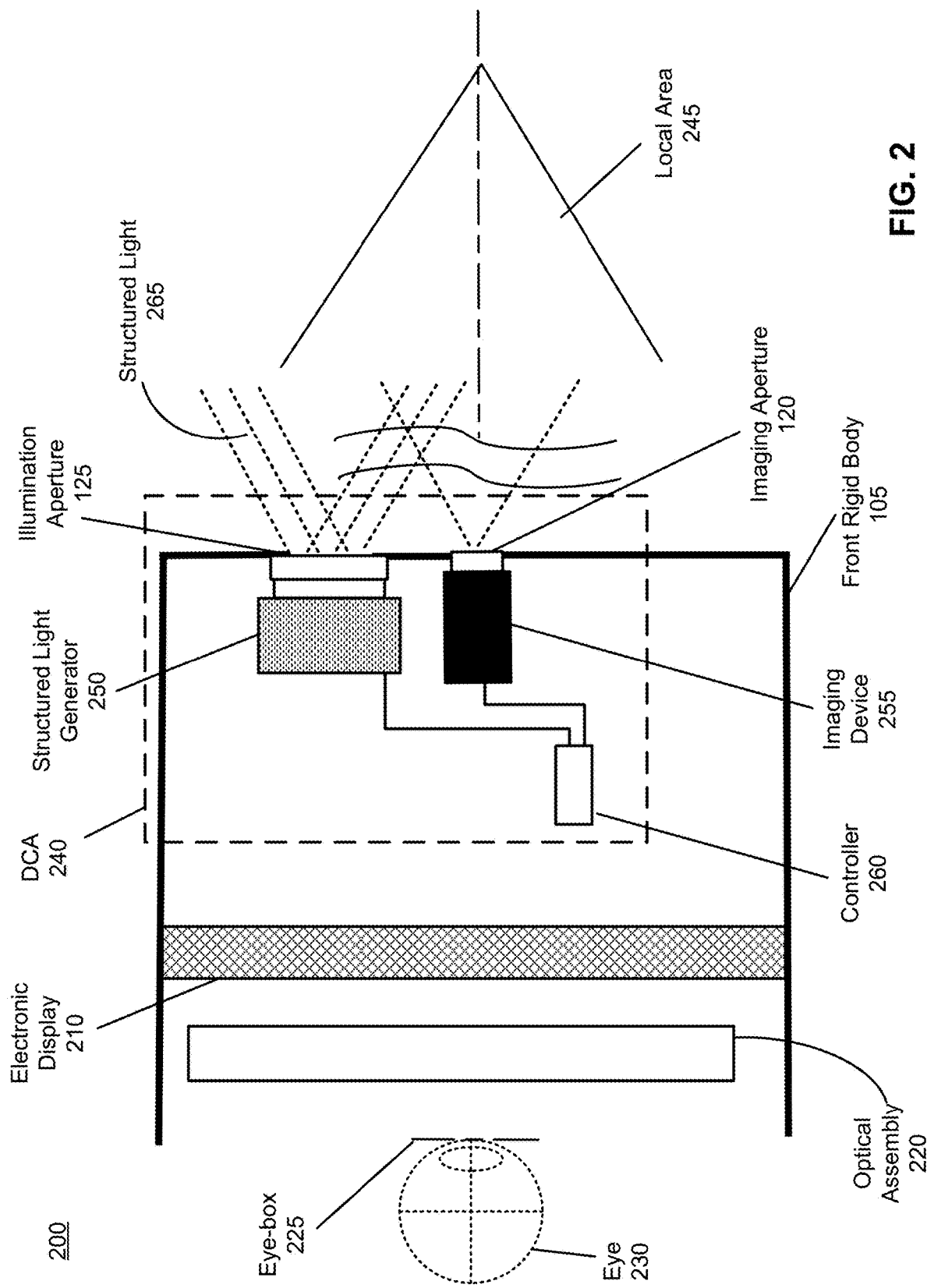
FIG. 2 is a cross section of a front rigid body of the HMD in FIG. 1, in accordance with an embodiment.

FIG. 2 is a cross section 200 of the front rigid body 105 of the HMD 100 shown in FIG. 1. As shown in FIG. 2, the front rigid body 105 includes an electronic display 210 and an optical assembly 220 that together provide image light to an eye-box 225. The eye-box 225 is a region in space that is occupied by a user's eye 230. For purposes of illustration, FIG. 2 shows a cross section 200 associated with a single eye 230, but another optical assembly 220, separate from the optical assembly 220, provides altered image light to another eye of the user.

The electronic display 210 generates image light. In some embodiments, the electronic display 210 includes an optical element that adjusts the focus of the generated image light. The electronic display 210 displays images to the user in accordance with data received from a console (not shown in FIG. 2). In various embodiments, the electronic display 210 may comprise a single electronic display or multiple electronic displays (e.g., a display for each eye of a user). Examples of the electronic display 210 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 220 magnifies received light from the electronic display 210, corrects optical aberrations associated with the image light, and the corrected image light is presented to a user of the HMD 100. At least one optical element of the optical assembly 220 may be an aperture, a Fresnel lens, a refractive lens, a reflective surface, a diffractive element, a waveguide, a filter, or any other suitable optical element that affects the image light emitted from the electronic display 210. Moreover, the optical assembly 220 may include combinations of different optical elements. In some embodiments, one or more of the optical elements in the optical assembly 220 may have one or more coatings, such as anti-reflective coatings, dichroic coatings, etc. Magnification of the image light by the optical assembly 220 allows elements of the electronic display 210 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view. In some embodiments, the optical assembly 220 is designed so its effective focal length is larger than the spacing to the electronic display 210, which magnifies the image light projected by the electronic display 210. Additionally, in some embodiments, the amount of magnification may be adjusted by adding or removing optical elements.

As shown in FIG. 2, the front rigid body 105 further includes a DCA 240 for determining depth information of one or more objects in a local area 245 surrounding some or all of the HMD 100. The DCA 240 includes a structured light generator 250, an imaging device 255, and a controller 260 that may be coupled to both the structured light generator 250 and the imaging device 255. The structured light generator 250 emits light through the illumination aperture 125. In accordance with embodiments of the present disclosure, the structured light generator 250 is configured to illuminate the local area 245 with structured light 265 in accordance with emission instructions generated by the controller 260. The controller 260 is configured to control, based on the emission instructions, operation of certain components of the structured light generator 250 to dynamically adjust a pattern of the structured light 265 illuminating the local area 245. More details about controlling the components of the structured light generator 250 and dynamically adjusting the pattern of the structured light 265 are disclosed in conjunction with FIGS. 3-4.

The structured light generator 250 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the structured light generator 250 can emit one or more light beams. More details about the DCA 240 that includes the structured light generator 250 are disclosed in conjunction with FIG. 3.

The imaging device 255 includes one or more cameras configured to capture, through the imaging aperture 120, at least a portion of the structured light 265 reflected from the local area 245. The imaging device 255 captures one or more images of one or more objects in the local area 245 illuminated with the structured light 265. The controller 260 coupled to the imaging device 255 is also configured to determine depth information for the one or more objects based on the captured portion of the reflected structured light. In some embodiments, the controller 260 provides the determined depth information to a console (not shown in FIG. 2) and/or an appropriate module of the HMD 100 (e.g., a varifocal module, not shown in FIG. 2). The console and/or the HMD 100 may utilize the depth information to, e.g., generate content for presentation on the electronic display 210.

In some embodiments, the front rigid body 105 further comprises an eye tracking system (not shown in FIG. 2) that determines eye tracking information for the user's eye 230. The determined eye tracking information may comprise information about an orientation of the user's eye 230 in an eye-box, i.e., information about an angle of an eye-gaze. In one embodiment, the user's eye 230 is illuminated with structured light. Then, the eye tracking system can use locations of the reflected structured light in a captured image to determine eye position and eye-gaze. In another embodiment, the eye tracking system determines eye position and eye-gaze based on magnitudes of image light captured over a plurality of time instants.

In some embodiments, the front rigid body 105 further comprises a varifocal module (not shown in FIG. 2). The varifocal module may adjust focus of one or more images displayed on the electronic display 210, based on the eye tracking information. In one embodiment, the varifocal module adjusts focus of the displayed images and mitigates vergence-accommodation conflict by adjusting a focal distance of the optical assembly 220 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 260 to generate content for presentation on the electronic display 210.

Figure 3:
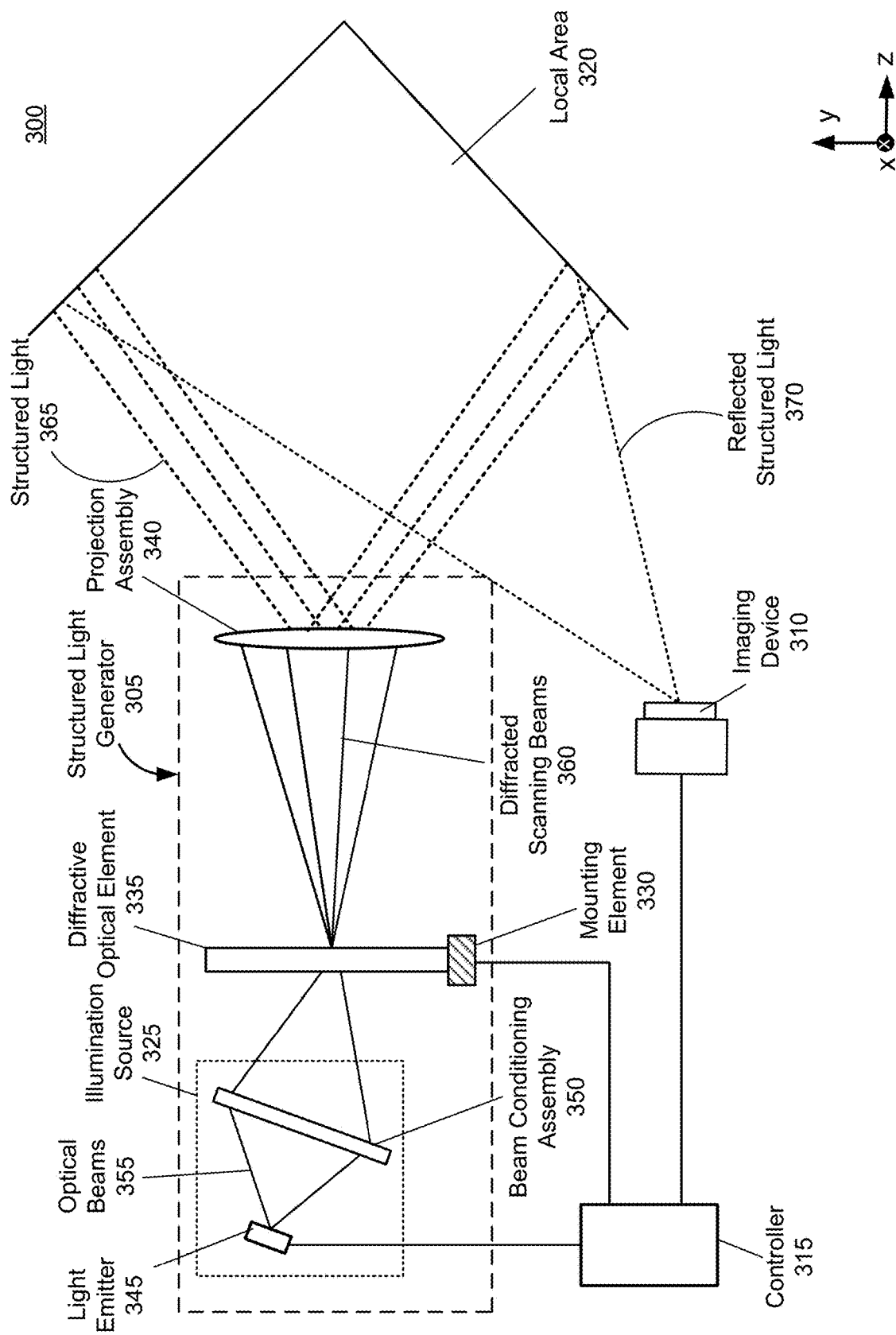
FIG. 3 is an example depth camera assembly (DCA), in accordance with an embodiment.

FIG. 3 is an example DCA 300, in accordance with an embodiment. The DCA 300 is configured for depth sensing over a large field-of-view using structured light of a dynamically adjustable pattern. The DCA 300 includes a structured light generator 305, an imaging device 310, and a controller 315 coupled to both the structured light generator 305 and the imaging device 310. The DCA 300 may be configured to be a component of the HMD 100 in FIG. 1. Thus, the DCA 300 may be an embodiment of the DCA 240 in FIG. 2; the structured light generator 305 may be an embodiment of the structured light generator 250 in FIG. 2; and the imaging device 310 may be an embodiment of the imaging device 255 in FIG. 2.

The structured light generator 305 is configured to illuminate and scan a local area 320 with structured light in accordance with emission instructions from the controller 315. The structured light generator 305 includes an illumination source 325, a mounting element 330, a DOE 335 mounted on the mounting element 330, and a projection assembly 340.

The illumination source 325 generates and directs light toward the DOE 335. The illumination source 325 includes a light emitter 345 and a beam conditioning assembly 350. The light emitter 345 is configured to emit one or more optical beams (pulses of light) 355, based in part on the emission instructions from the controller 315. In some embodiments, the light emitter 345 includes an array of laser diodes that emit the one or more optical beams 355 in an infrared spectrum. In other embodiments, the light emitter 345 includes an array of laser diodes that emit the one or more optical beams 355 in a visible spectrum. In some embodiments, the light emitter 345 emits the one or more optical beams 355 as structured light of a defined pattern (e.g., dot pattern, or line pattern). Alternatively or additionally, the light emitter 345 emits the one or more optical beams 355 as temporally modulated light based in part on the emission instructions from the controller 315 to generate temporally modulated illumination of the local area 320, e.g., in addition to structured illumination.

The beam conditioning assembly 350 collects the one or more optical beams 355 emitted from the light emitter 345 and directs the one or more optical beams 355 toward at least a portion of the DOE 335. The beam conditioning assembly 350 is composed of one or more optical elements (lenses). In some embodiments, the beam conditioning assembly 350 includes a collimation assembly and a prism (not shown in FIG. 3). The collimation assembly includes one or more optical elements (lenses) that collimate the one or more optical beams 355 into collimated light. The prism is an optical element that directs the collimated light into the DOE 335. In alternate embodiments, the beam conditioning assembly 350 includes a single hybrid optical element (lens) that both collimates the one or more optical beams 355 to generate collimated light and directs the collimated light into the portion of the DOE 335.

The DOE 335 generates diffracted scanning beams 360 from the one or more optical beams 355, based in part on the emission instructions from the controller 315. The DOE 335 may be implemented as: an acousto-optic device, a liquid crystal on Silicon (LCOS) device, a spatial light modulator, a digital micro-mirror device, a microelectromechanical (MEM) device, some other diffraction grating element, or combination thereof. In some embodiments, operation of the DOE 335 can be controlled, based in part on the emission instructions from the controller 315. For example, the controller 315 may adjust a voltage level applied to the DOE 335 or a radio frequency of a signal controlling a transducer of the DOE 335 (not shown in FIG. 3) such that a diffraction angle of the DOE 335 varies in real time to form the diffracted scanning beams 360 at the output of the DOE 335 having a pattern that varies over time.

The DOE 335 is mounted on the mounting element 330. The mounting element 330 is configured to have a plurality of adjustable positions relative to the illumination source 325, e.g., based in part on the emission instructions from the controller 315. In some embodiments, the mounting element 330 can be shifted, e.g., along z axis, based in part on the emission instructions from the controller 315. Thus, a distance of the DOE 335 from the illumination source 325 and the light emitter 345 along z axis can be adjustable. In other embodiments, the mounting element 330 can change an angular position of the DOE 335 relative to the light emitter 345 and the beam conditioning assembly 350, e.g., in the x-z plane and/or x-y plane, based in part on the emission instructions from the controller 315. In yet other embodiments, the mounting element 330 can pivot around, e.g., z axis, based in part on the emission instructions from the controller 315 in order to change a position of the DOE 335 relative to the light emitter 345 and the beam conditioning assembly 350. It should be understood that adjusting a position of the DOE 335 caused by changing a position of the mounting element 330 can refer to both shifting the DOE 335 along the z axis, and adjusting an angular position of the DOE 335.

A pattern of the diffracted scanning beams 360 generated by the DOE 335 mounted on the mounting element 330 may be different for each position of the mounting element 330 of the plurality of adjustable positions. By generating different patterns of the diffracted scanning beams 360, a pattern of the structured light 365 illuminating the local area 320 varies over time. Having ability to dynamically adjust a pattern of the diffracted scanning beams 360 and a pattern of the structured light 365 provides flexibility to scanning of different areas of the local area 320 and various types of objects in the local area 320.

For a preferred diffraction efficiency, the DOE 335 may be configured to diffract the one or more optical beams 355 incident to at least a portion of the DOE 335 at an angle that satisfies the Bragg matching condition to form the diffracted scanning beams 360 based in part on the emission instructions from the controller 315. In some embodiments, the DOE 335 can be configured to generate the diffracted scanning beams 360 as polarized light (e.g., circularly polarized light) by orienting the one or more optical beams 355 to, e.g., a liquid crystal in the DOE 335 in a geometry satisfying the Bragg matching condition. Note that the diffracted scanning beams 360 can be either right handed circularly polarized or left handed circularly polarized based on the liquid crystal in the DOE 335. In some embodiments, a state of polarization (SOP) of the one or more optical beams 355 incident to the DOE 335 matches an eigenstate of polarization at the Bragg angle for achieving maximum diffraction efficiency of the DOE 335.

The projection assembly 340 is positioned in front of the DOE 335. The projection assembly 340 includes one or more optical elements (lenses). The projection assembly 340 projects the diffracted scanning beams 360 as the structured light 365 into the local area 320, e.g., over a wide field-of-view. A pattern of the structured light 365 is dynamically adjustable over time based in part on a position of the mounting element 335 relative to the illumination source 325. The structured light 365 illuminates portions of the local area 320, including one or more objects in the local area 320. As the pattern of the structured light 365 is dynamically adjustable over time, different portions of the local area 320 may be illuminated in different time instants.

Reflected structured light 370 may be generated based on reflection of the structured light 365 from the one or more objects in the local area 320.

The imaging device 310 captures one or more images of the one or more objects in the local area 320 by capturing at least a portion of the reflected structured light 370. In one embodiment, the imaging device 310 is an infrared camera configured to capture images in an infrared spectrum. In another embodiment, the imaging device 310 is configured to capture images of visible spectrum light. The imaging device 310 may include a charge-coupled device (CCD) detector, a complementary metal-oxide-semiconductor (CMOS) detector or some other types of detectors (not shown in FIG. 3). The imaging device 310 may be configured to operate with a frame rate in the range of approximately 0.1 Hz to approximately 1 KHz for fast detection of objects in the local area 320. In some embodiments, the imaging device 310 includes a two-dimensional detector pixel array for capturing at least the portion of the reflected structured light 370. In other embodiments, the imaging device 310 includes more than one camera for capturing at least the portion of the reflected structured light 370.

In some embodiments, the imaging device 310 may include a polarizing element (not shown in FIG. 3) placed in front of a camera for receiving and propagating the reflected structured light 370 of a particular polarization. The polarizing element can be a linear polarizer, a circular polarizer, an elliptical polarizer, etc. The polarizing element can be implemented as a thin film polarizer (absorptive, reflective), a quarter wave plate combined with a linear polarizer, etc. The reflected structured light 370 may be selected from a group consisting of linearly polarized light (vertical and horizontal), right handed circularly polarized light, left handed circularly polarized light, and elliptically polarized light. It should be noted that polarization of the reflected structured light 370 can be different than polarization of the structured light 370 that illuminates the local area 320.

The controller 315 controls operations of various components of the DCA 300 in FIG. 3. In some embodiments, the controller 315 provides emission instructions to the light emitter 345 to control intensity of the emitted one or more optical beams 355, spatial modulation of the one or more optical beams 355, a time duration during which the light emitter 345 is activated, etc. The controller 315 may further create the emission instructions for controlling a position of the mounting element 330 where the DOE 335 is mounted to dynamically adjust a position of the DOE 335 causing dynamic adjustment of a pattern of the diffracted scanning beams 360 and a pattern of the structured light 365 illuminating the local area 320. In some embodiments, the controller 315 is electrically coupled to the mounting element 330 and provides electrical signals for actuating the mounting element 330 for adjusting a position of the mounting element 330 and a position of the DOE 335. In alternate embodiments, the controller 315 is mechanically coupled to the mounting element 330 to control a position of the mounting element 330 and a position of the DOE 335, e.g., using a voice coil, solenoid, or other mechanical actuation assembly for adjusting a position of the DOE 335 mounted on the mounting element 330. In some other embodiments (not shown in FIG. 3), the controller 315 may control a position of the mounting element 330 and a position of the DOE 335 by using, e.g., a piezo actuator, a piezo worm, a Micro-Electro-Mechanical System (MEMS) actuator, a shape memory alloy, a rack and pinion, or some combination thereof.

In some embodiments, the controller 315 is configured to synchronize operation of the light emitter 345 with a position of the mounting element 330 and a position of the DOE 335 mounted on the mounting element 330. In one embodiment, the controller 315 is configured to run an actuator open loop (e.g., to operate as a stepper) in order to synchronize operation of the light emitter 345 with the position of the mounting element 330 and the position of the DOE 335. In other embodiment, the controller 315 is configured to operate in a close loop with a sensor (not shown in FIG. 3) in order to synchronize operation of the light emitter 345 with the position of the mounting element 330 and the position of the DOE 335. The sensor coupled to the controller 315 may be implemented as e.g., an optical encoder sensor, an optical reflectance sensor, a magnetic eddy sensor, a magnetic Hall sensor, a magnetic Anisotropic Magneto-Resistance (AMR) sensor, a magnetic Giant Magneto-Resistance (GMR) sensor, or some combination thereof.

In some embodiments, the controller 315 may provide the emission instructions to the light emitter 345 to control emitting the one or more optical beams 355, e.g., instructions about a spatial modulation, temporal modulation or intensity related to the one or more optical beams 355 emitted from the light emitter 345. The controller 315 may also control a position of the mounting element 330 (e.g., via the emission instructions) to adjust a position of the DOE 335 in accordance with the one or more optical beams 355 emitted from the light emitter 345. In one embodiment, the controller 315 adjusts a position of the mounting element 330 and a position of the DOE 335 based on a spatial modulation of the one or more optical beams 355 generated by the light emitter 345. In another embodiment, the controller 315 adjusts a position of the mounting element 330 and a position of the DOE 335 based on a temporal modulation of the one or more optical beams 355 generated by the light emitter 345. In yet another embodiment, the controller 315 adjusts a position of the mounting element 330 and a position of the DOE 335 based on an intensity of the one or more optical beams 355.

In some embodiments, the controller 315 adjusts a position of the mounting element 330 to change an angular position of the DOE 335 relative to the illumination source 325, based in part on the emission instructions. For example, the controller 315 may instruct the mounting element 330 to rotate the DOE 335 by a specific angle, e.g., about the x-axis, about the y-axis, about the z-axis, or some combination thereof. In alternate embodiments, the controller 315 adjusts a position of the mounting element 330 to translate the DOE 335 relative to the illumination source 325, e.g., along z axis, along the x-axis, along, the y-axis, or some combination thereof, based in part on the emission instructions.

In some embodiments, the controller 315 obtains information about a spatial resolution of a pattern of the structured light 365 illuminating the local area 320. Based on the information about the spatial resolution of the structured light 365, the controller 315 may change a position of the mounting element 330 in order to adjust a position of the DOE 335 and a spatial resolution of a pattern of the diffracted scanning beams 360 and of a pattern of the structured light 365. Thus, the controller 315 is configured to control a spatial resolution of a pattern of the structured light 365 illuminating the local area 320 by adjusting a position of the mounting element 330.

As shown in FIG. 3, the controller 315 is further coupled to the imaging device 310 and can be configured to determine depth information for the one or more objects in the local area 320. The controller 315 determines depth information for the one or more objects based in part on the one or more images captured by the imaging device 310. The controller 315 may be configured to determine the depth information based on phase-shifted patterns of light captured by the imaging device 310 distorted by shapes of the one or more objects in the local area 320, and to use triangulation calculation to obtain a depth map of the local area 320. Alternatively, the controller 315 may be configured to determine the depth information based on time-of-flight information and information about a pattern of the reflected structured light 370 distorted by shapes of the one or more objects. In some embodiments, the controller 315 can be configured to determine the depth information based on polarization information of the reflected structured light 370 and/or polarization information of the structured light 365.

In some embodiments, based on the determined depth information for the one or more objects in the local area 320, the controller 315 may adjust (e.g., based in part on the emission instructions) a position of the mounting element 330 to dynamically change a position of the DOE 335 relative to the light emitter 345 and the beam conditioning assembly 350 to adjust diffraction of the one or more optical beams 355. The controller 315 can instruct the mounting element 330 to dynamically adjust a position of the DOE 335 and diffraction of the one or more optical beams 355 based on a quality of the determined depth information, surface types of the one or more objects in the local area 320, etc. Additionally or alternatively, the controller 315 may control (e.g., based in part on the emission instructions) a position of the mounting element 330 to adjust a position of the DOE 335 relative to the light emitter 345 and the beam conditioning assembly 350 to adjust diffraction of the one or more optical beams 355, based on location information of the one or more objects in the local area 320. Thus, the controller 315 may dynamically adjusts a pattern of the structured light 365 based on a location of an object of interest in the local area 320.

In some embodiments, the controller 315 may adjust a position of the mounting element 330 and a position of the DOE 335 such that the structured light 365 is pointed at a region or regions of interest of the local area 320. In other embodiments, the controller 315 may control a position of the mounting element 330 and a position of the DOE 335 to adjust a density of a pattern of the structured light 365 depending on a distance, e.g., along z axis, to an object of interest in the local area 320. In yet other embodiments, the controller 315 may control a position of the mounting element 330 and a position of the DOE 335 decrease a density of a pattern of the structured light 365 to save power, e.g., dissipated by the imaging device 310 and the controller 315 for capturing a portion of the reflected structured light 370 and depth determination. In yet other embodiments, the controller 315 may control a position of the mounting element 330 and a position of the DOE 335 to increase a density of a pattern of the structured light 365 in order to increase a number of depth points in a depth map of the local area 320. In yet other embodiments, the controller 315 may control a position of the mounting element 330 and a position of the DOE 335 to change a pattern of the structured light 365 to be more suitable for e.g., hand tracking versus room or object reconstruction. In yet other embodiments, the controller 315 may control a position of the mounting element 330 and a position of the DOE 335 to calibrate out errors in pointing the structured light 365 that may be caused by an assembly of the DCA 300 (e.g., by the DOE 335 and/or the projection assembly 340).

Figure 4:
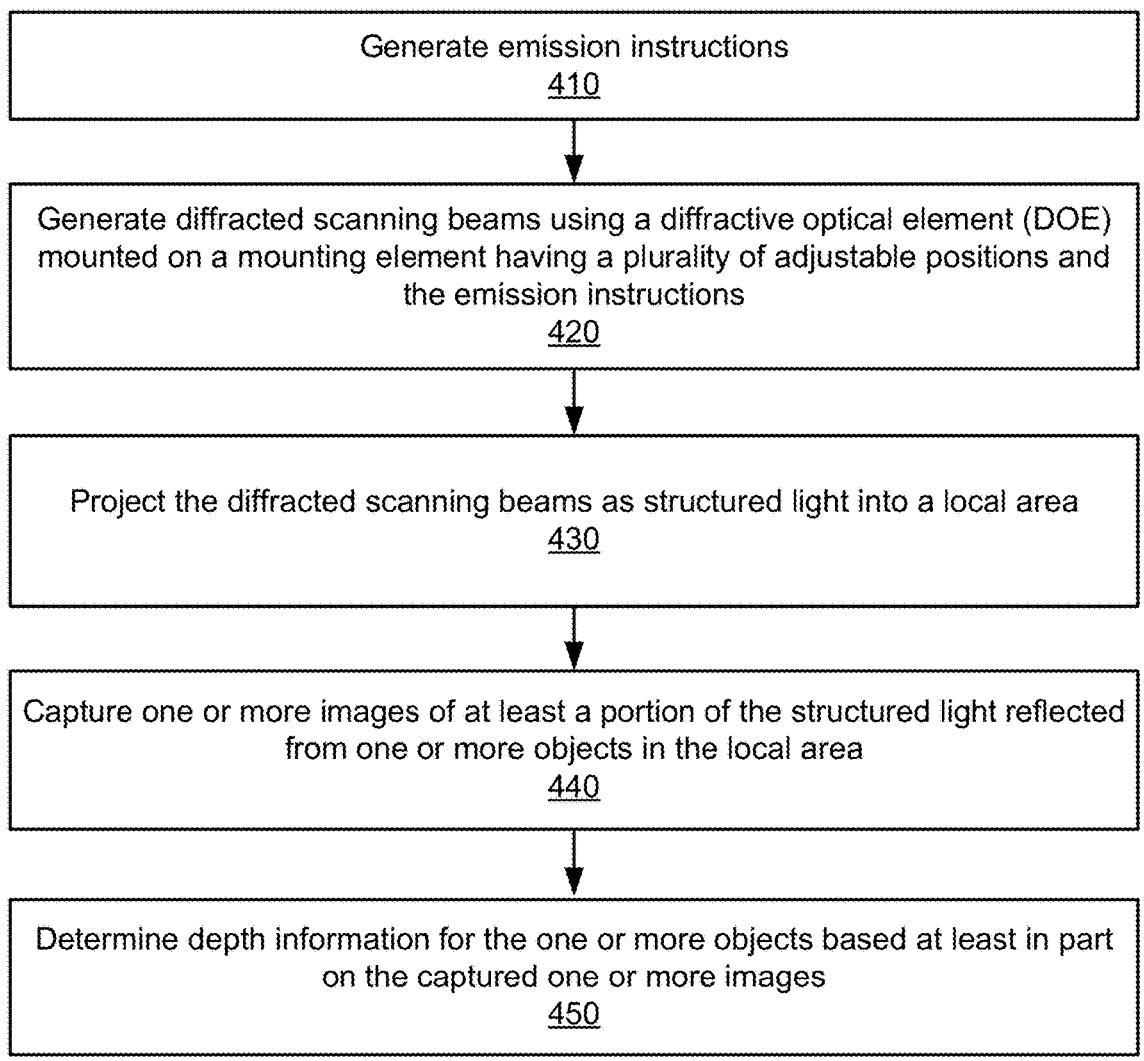
FIG. 4 is a flow chart illustrating a process of determining depth information of objects in a local area, in accordance with an embodiment.

FIG. 4 is a flow chart illustrating a process 400 of determining depth information of objects in a local area, in accordance with an embodiment. The process 400 of FIG. 4 may be performed by the components of a DCA (e.g., the DCA 300). Other entities (e.g., a HMD and/or console) may perform some or all of the steps of the process in other embodiments. Likewise, embodiments may include different and/or additional steps, or perform the steps in different orders.

The DCA generates 410 (e.g., via a controller) emission instructions. The DCA may provide the emission instructions to an illumination source, a mounting element and/or a DOE mounted on the mounting element within a housing of the DCA. Based on the emission instructions, the illumination source may emit one or more optical beams (one or more pulses of light). Based on the emission instructions, the emitted optical beams may have a specific intensity and/or modulation (spatial, temporal, etc.). In some embodiments, the DCA generates the emission instructions which include instructions for the mounting element to change its position and/or angular orientation relative to the illumination source.

The DCA generates 420 (e.g., via the DOE) diffracted scanning beams using the DOE mounted on the mounting element having a plurality of adjustable positions and the emission instructions. The DOE diffracts the one or more pulses of light emitted from the illumination source to generate the diffracted scanning beams. The diffracted scanning beams may have a unique pattern for each position of the mounting element of the plurality of adjustable positions.

The DCA projects 430 (e.g., via a projection assembly) the diffracted scanning beams as structured light into the local area. A pattern of the structured light is dynamically adjustable based in part on an adjustable position of the mounting element of the plurality of adjustable positions. The pattern of the structured light may vary in real time in order to illuminate different portions of the local area during different time instants.

The DCA captures 440 (e.g., via an imaging device) one or more images of at least a portion of the structured light reflected from one or more objects in the local area. In some embodiments, the imaging device includes a two-dimensional detector pixel array that captures the one or more images. In other embodiments, the imaging device includes more than one camera for capturing the one or more images. In some embodiments, the imaging device of includes a polarizing element and a camera, wherein the polarizing element is positioned in front of the camera. The polarizing element is configured to receive at least the portion of the reflected structured light having a specific polarization and to propagate the received portion of reflected polarized light to the camera.

The DCA determines 450 (e.g., via the controller) depth information for the one or more objects based in part on the captured one or more images. In some embodiments, the DCA determines the depth information for the one or more objects based on information about a pattern of the reflected structured light distorted by shapes of the one or more objects. The DCA may also determine the depth information for the one or more objects based in part on polarization information of the captured portion of the reflected structured light.

In some embodiments, the DCA is configured as part of a HMD, e.g., the HMD 100 in FIG. 1. In one embodiment, the DCA provides the determined depth information to a console coupled to the HMD. The console is then configured to generate content for presentation on an electronic display of the HMD, based on the depth information. In another embodiment, the DCA provides the determined depth information to a module of the HMD that generates content for presentation on the electronic display of the HMD, based on the depth information. In an alternate embodiment, the DCA is integrated into a HMD as part of an AR system. In this case, the DCA may be configured to sense and display objects behind a head of a user wearing the HMD or display objects recorded previously. In yet other embodiment, the DCA is integrated into a base station or a sensor bar external to the HMD. In this case, the DCA may be configured to sense various body parts of a user wearing the HMD, e.g., the user's lower body. In yet other embodiment, the DCA is configured as part of a controller or as part of a capture system to capture VR content, AR content, or MR content.

System Environment

Figure 5:
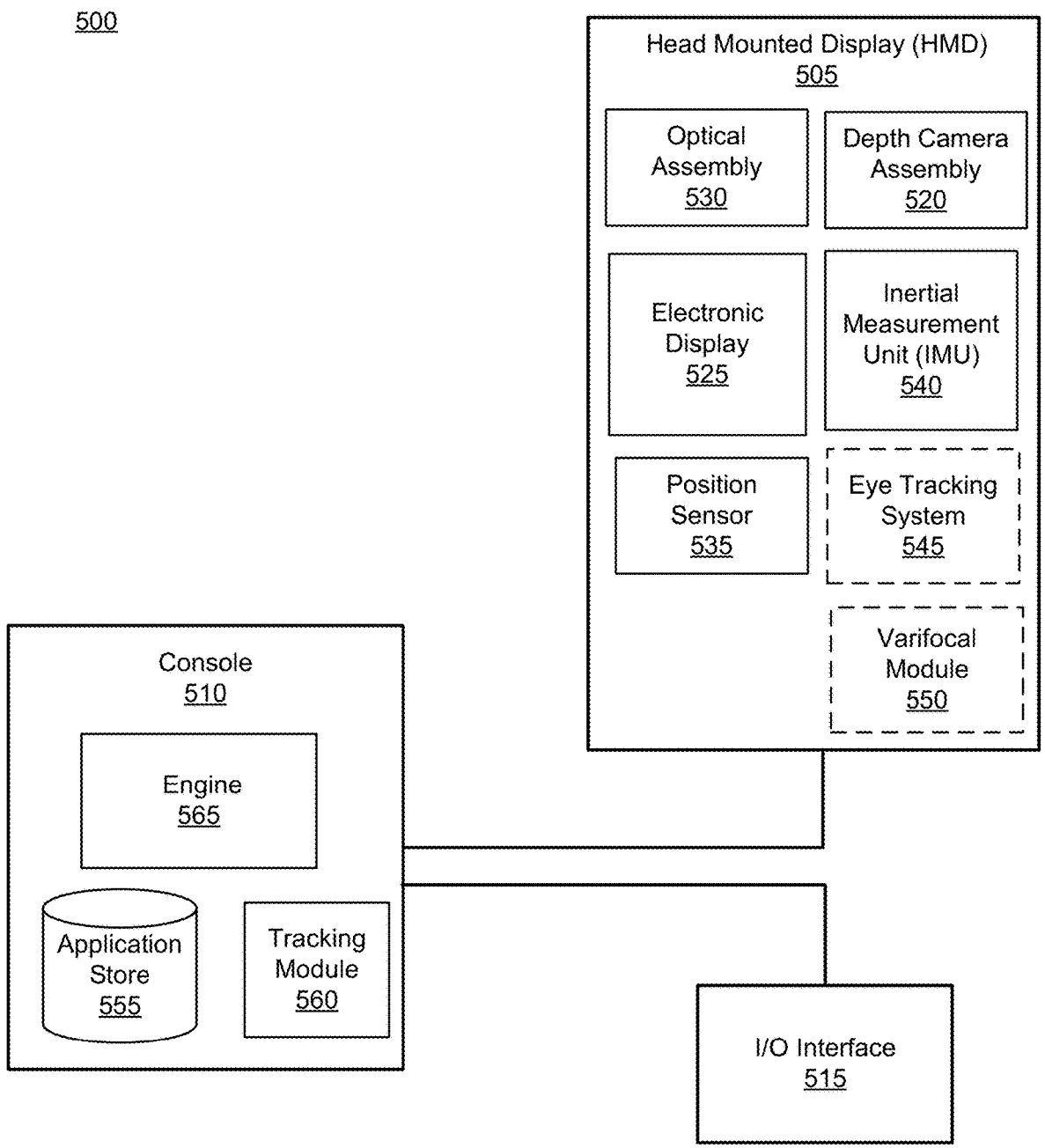
FIG. 5 is a block diagram of a HMD system in which a console operates, in accordance with an embodiment.

FIG. 5 is a block diagram of one embodiment of a HMD system 500 in which a console 510 operates. The HMD system 500 may operate in a VR system environment, an AR system environment, a MR system environment, or some combination thereof. The HMD system 500 shown by FIG. 5 comprises a HMD 505 and an input/output (I/O) interface 515 that is coupled to the console 510. While FIG. 5 shows an example HMD system 500 including one HMD 505 and on I/O interface 515, in other embodiments any number of these components may be included in the HMD system 500. For example, there may be multiple HMDs 505 each having an associated I/O interface 515, with each HMD 505 and I/O interface 515 communicating with the console 510. In alternative configurations, different and/or additional components may be included in the HMD system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the HMD 505.

The HMD 505 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 505 is the HMD 100 described above in conjunction with FIG. 1.

The HMD 505 includes a DCA 520, an electronic display 525, an optical assembly 530, one or more position sensors 535, an IMU 540, an optional eye tracking system 545, and an optional varifocal module 550. Some embodiments of the HMD 505 have different components than those described in conjunction with FIG. 5. Additionally, the functionality provided by various components described in conjunction with FIG. 5 may be differently distributed among the components of the HMD 505 in other embodiments.

The DCA 520 captures data describing depth information of a local area surrounding some or all of the HMD 505. The DCA 520 can compute the depth information using the data (e.g., based on a captured portion of a structured light pattern), or the DCA 520 can send this information to another device such as the console 510 that can determine the depth information using the data from the DCA 520.

The DCA 520 includes a structured light generator, an imaging device and a controller coupled to the structured light generator and the imaging device. The structured light generator of the DCA 520 is configured to illuminate the local area with a structured light pattern (e.g., dot pattern, line pattern, etc.) in accordance with emission instructions. The structured light generator of the DCA 520 includes an illumination source, a mounting element, a DOE, and a projection assembly. The illumination source is configured to emit one or more pulses of light based in part on the emission instructions. The mounting element is configured to have a plurality of adjustable positions relative to the illumination source based in part on the emission instructions. The DOE is mounted on the mounting element and generates diffracted scanning beams from the one or more pulses of light, the diffracted scanning beams having a different pattern for each position of the mounting element of the plurality of adjustable positions. The projection assembly is configured to project the diffracted scanning beams as the structured light into the local area. A pattern of the structured light is dynamically adjustable based in part on an adjustable position of the mounting element of the plurality of adjustable positions. The imaging device of the DCA 520 captures one or more images of at least a portion of the structured light reflected from the one or more objects in the local area. The controller of the DCA 520 generates the emission instructions and provides the emission instructions to the structured light generator. The controller of the DCA 520 further determines depth information for the one or more objects based in part on the captured one or more images. The DCA 520 may be an embodiment of the DCA 240 in FIG. 2 or the DCA 300 in FIG. 3.

The electronic display 525 displays two-dimensional or three-dimensional images to the user in accordance with data received from the console 510. In various embodiments, the electronic display 525 comprises a single electronic display or multiple electronic displays (e.g., a display for each eye of a user). Examples of the electronic display 525 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof. In some embodiments, the electronic display 525 may represent the electronic display 210 in FIG. 2.

The optical assembly 530 magnifies image light received from the electronic display 525, corrects optical errors associated with the image light, and presents the corrected image light to a user of the HMD 505. The optical assembly 530 includes a plurality of optical elements. Example optical elements included in the optical assembly 530 include: an aperture, a Fresnel lens, a convex lens, a concave lens, a filter, a reflecting surface, or any other suitable optical element that affects image light. Moreover, the optical assembly 530 may include combinations of different optical elements. In some embodiments, one or more of the optical elements in the optical assembly 530 may have one or more coatings, such as partially reflective or anti-reflective coatings.

Magnification and focusing of the image light by the optical assembly 530 allows the electronic display 525 to be physically smaller, weigh less and consume less power than larger displays. Additionally, magnification may increase the field-of-view of the content presented by the electronic display 525. For example, the field-of-view of the displayed content is such that the displayed content is presented using almost all (e.g., approximately 110 degrees diagonal), and in some cases all, of the user's field-of-view. Additionally in some embodiments, the amount of magnification may be adjusted by adding or removing optical elements.

In some embodiments, the optical assembly 530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 525 for display is pre-distorted, and the optical assembly 530 corrects the distortion when it receives image light from the electronic display 525 generated based on the content. In some embodiments, the optical assembly 530 may represent the optical assembly 220 in FIG. 2.

The IMU 540 is an electronic device that generates data indicating a position of the HMD 505 based on measurement signals received from one or more of the position sensors 535 and from depth information received from the DCA 520. A position sensor 535 generates one or more measurement signals in response to motion of the HMD 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the HMD 505 relative to an initial position of the HMD 505. For example, the position sensors 535 include multiple accelerometers to measure translational motion (forward/back, up/down, left/right) and multiple gyroscopes to measure rotational motion (e.g., pitch, yaw, roll). In some embodiments, the position sensors 535 may represent the position sensors 135 in FIG. 1. In some embodiments, the IMU 540 rapidly samples the measurement signals and calculates the estimated current position of the HMD 505 from the sampled data. For example, the IMU 540 integrates the measurement signals received from the accelerometers over time to estimate a velocity vector and integrates the velocity vector over time to determine an estimated current position of a reference point on the HMD 505. Alternatively, the IMU 540 provides the sampled measurement signals to the console 510, which interprets the data to reduce error. The reference point is a point that may be used to describe the position of the HMD 505. The reference point may generally be defined as a point in space or a position related to the HMD's 505 orientation and position.

The IMU 540 receives one or more parameters from the console 510. The one or more parameters are used to maintain tracking of the HMD 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the HMD 505, the IMU 540 may be a dedicated hardware component. In other embodiments, the IMU 540 may be a software component implemented in one or more processors. In some embodiments, the IMU 540 may represent the IMU 130 in FIG. 1.

In some embodiments, the eye tracking system 545 is integrated into the HMD 505. The eye tracking system 545 determines eye tracking information associated with an eye of a user wearing the HMD 505. The eye tracking information determined by the eye tracking system 545 may comprise information about an orientation of the user's eye, i.e., information about an angle of an eye-gaze. In some embodiments, the eye tracking system 545 is integrated into the optical assembly 530. An embodiment of the eye-tracking system 545 may comprise an illumination source and an imaging device (camera).

In some embodiments, the varifocal module 550 is further integrated into the HMD 505. The varifocal module 550 may be coupled to the eye tracking system 545 to obtain eye tracking information determined by the eye tracking system 545. The varifocal module 550 may be configured to adjust focus of one or more images displayed on the electronic display 525, based on the determined eye tracking information obtained from the eye tracking system 545. In this way, the varifocal module 550 can mitigate vergence-accommodation conflict in relation to image light. The varifocal module 550 can be interfaced (e.g., either mechanically or electrically) with at least one of the electronic display 525 and at least one optical element of the optical assembly 530. Then, the varifocal module 550 may be configured to adjust focus of the one or more images displayed on the electronic display 525 by adjusting position of at least one of the electronic display 525 and the at least one optical element of the optical assembly 530, based on the determined eye tracking information obtained from the eye tracking system 545. By adjusting the position, the varifocal module 550 varies focus of image light output from the electronic display 525 towards the user's eye. The varifocal module 550 may be also configured to adjust resolution of the images displayed on the electronic display 525 by performing foveated rendering of the displayed images, based at least in part on the determined eye tracking information obtained from the eye tracking system 545. In this case, the varifocal module 550 provides appropriate image signals to the electronic display 525. The varifocal module 550 provides image signals with a maximum pixel density for the electronic display 525 only in a foveal region of the user's eye-gaze, while providing image signals with lower pixel densities in other regions of the electronic display 525. In one embodiment, the varifocal module 550 may utilize the depth information obtained by the DCA 520 to, e.g., generate content for presentation on the electronic display 525.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the HMD 505 for processing in accordance with information received from one or more of: the DCA 520, the HMD 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the HMD 505 or the I/O interface 515. Examples of applications include: gaming applications, conferencing applications, video playback applications, or other suitable applications.

The tracking module 560 calibrates the HMD system 500 using one or more calibration parameters and may adjust one or more calibration parameters to reduce error in determination of the position of the HMD 505 or of the I/O interface 515. For example, the tracking module 560 communicates a calibration parameter to the DCA 520 to adjust the focus of the DCA 520 to more accurately determine positions of structured light elements captured by the DCA 520. Calibration performed by the tracking module 560 also accounts for information received from the IMU 540 in the HMD 505 and/or an IMU 540 included in the I/O interface 515. Additionally, if tracking of the HMD 505 is lost (e.g., the DCA 520 loses line of sight of at least a threshold number of structured light elements), the tracking module 560 may re-calibrate some or all of the HMD system 500.

The tracking module 560 tracks movements of the HMD 505 or of the I/O interface 515 using information from the DCA 520, the one or more position sensors 535, the IMU 540 or some combination thereof. For example, the tracking module 550 determines a position of a reference point of the HMD 505 in a mapping of a local area based on information from the HMD 505. The tracking module 560 may also determine positions of the reference point of the HMD 505 or a reference point of the I/O interface 515 using data indicating a position of the HMD 505 from the IMU 540 or using data indicating a position of the I/O interface 515 from an IMU 540 included in the I/O interface 515, respectively. Additionally, in some embodiments, the tracking module 560 may use portions of data indicating a position or the HMD 505 from the IMU 540 as well as representations of the local area from the DCA 520 to predict a future location of the HMD 505. The tracking module 560 provides the estimated or predicted future position of the HMD 505 or the I/O interface 515 to the engine 555.

The engine 565 generates a 3D mapping of the area surrounding some or all of the HMD 505 (i.e., the "local area") based on information received from the HMD 505. In some embodiments, the engine 565 determines depth information for the 3D mapping of the local area based on information received from the DCA 520 that is relevant for techniques used in computing depth. The engine 565 may calculate depth information using one or more techniques in computing depth from structured light. In various embodiments, the engine 565 uses the depth information to, e.g., update a model of the local area, and generate content based in part on the updated model.

The engine 565 also executes applications within the HMD system 500 and receives position information, acceleration information, velocity information, predicted future positions, or some combination thereof, of the HMD 505 from the tracking module 560. Based on the received information, the engine 565 determines content to provide to the HMD 505 for presentation to the user. For example, if the received information indicates that the user has looked to the left, the engine 565 generates content for the HMD 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the HMD 505 or haptic feedback via the I/O interface 515.

In some embodiments, based on the eye tracking information (e.g., orientation of the user's eye) received from the eye tracking system 545, the engine 565 determines resolution of the content provided to the HMD 505 for presentation to the user on the electronic display 525. The engine 565 provides the content to the HMD 505 having a maximum pixel resolution on the electronic display 525 in a foveal region of the user's gaze, whereas the engine 565 provides a lower pixel resolution in other regions of the electronic display 525, thus achieving less power consumption at the HMD 505 and saving computing cycles of the console 510 without compromising a visual experience of the user. In some embodiments, the engine 565 can further use the eye tracking information to adjust where objects are displayed on the electronic display 525 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
   a structured light generator configured to illuminate a local area with structured light in accordance with emission instructions, the structured light generator comprising:
      an illumination source configured to emit one or more pulses of light based in part on the emission instructions,
      a mounting element configured to have a plurality of adjustable positions relative to the illumination source based in part on the emission instructions,
      a diffractive optical element (DOE) mounted on the mounting element that generates diffracted scanning beams from the one or more pulses of light, the diffracted scanning beams having a different pattern for each position of the mounting element of the plurality of adjustable positions, and
      a projection assembly configured to project the diffracted scanning beams as the structured light into the local area, a pattern of the structured light being dynamically adjustable based in part on an adjustable position of the mounting element of the plurality of adjustable positions;

an imaging device configured to capture one or more images of at least a portion of the structured light reflected from one or more objects in the local area; and a controller configured to:
generate the emission instructions,
provide the emission instructions to the structured light generator, and
determine depth information for the one or more objects based in part on the captured one or more images.

2. The DCA of claim 1, wherein the controller is further configured to:
provide the emission instructions to the illumination source to control emitting the one or more pulses of light; and
adjust a position of the mounting element to position the DOE in accordance with the one or more pulses of light, based in part on the emission instructions.

3. The DCA of claim 1, wherein each position of the mounting element of the plurality of adjustable positions results in a unique pattern of the structured light.

4. The DCA of claim 1, wherein the illumination source includes:
a light emitter configured to emit the one or more pulses of light, based in part on the emission instructions;
a collimation assembly configured to collimate the one or more pulses of light into collimated light; and
a prism configured to direct the collimated light into the DOE.

5. The DCA of claim 1, wherein the illumination source includes:
a light emitter configured to emit the one or more pulses of light, based in part on the emission instructions; and
a single optical element configured to:
collimate the one or more pulses of light to generate collimated light, and
direct the collimated light into the DOE.

6. The DCA of claim 1, wherein the DOE diffracts the one or more pulses of light incident to the DOE at an angle that satisfies the Bragg matching condition to form the diffracted scanning beams based in part on the emission instructions.

7. The DCA of claim 1, wherein the one or more pulses of light are temporally modulated providing the structured light to be temporally modulated.

8. The DCA of claim 1, wherein the controller is further configured to:
dynamically adjust a position of the mounting element, based in part on the determined depth information.

9. The DCA of claim 1, wherein the controller is further configured to:
dynamically adjust a position of the mounting element, based in part on location information related to the one or more objects in the local area.

10. The DCA of claim 1, wherein the controller is further configured to:
adjust a position of the mounting element to change an angular position of the DOE relative to the illumination source, based in part on the emission instructions.

11. The DCA of claim 1, wherein the controller is further configured to:
adjust a position of the mounting element to translate the DOE along at least one dimension relative to the illumination source, based in part on the emission instructions.

12. The DCA of claim 1, the controller is further configured to:
obtain information about a spatial resolution related to a pattern of the structured light; and
adjust a position of the mounting element, based on the information about the spatial resolution.

13. The DCA of claim 1, the controller is further configured to:
control a spatial resolution related to a pattern of the structured light by adjusting a position of the mounting element.

14. The DCA of claim 1, wherein the DCA is a component of a head-mounted display.

15. A method comprising:
generating emission instructions;
generating, based in part on the emission instructions, diffracted scanning beams from one or more pulses of light by diffracting the one or more pulses of light using a diffractive optical element (DOE) mounted on a mounting element having a plurality of adjustable positions, the diffracted scanning beams having a different pattern for each position of the mounting element of the plurality of adjustable positions;
projecting the diffracted scanning beams as structured light into the local area, a pattern of the structured light being dynamically adjustable based in part on an adjustable position of the mounting element of the plurality of adjustable positions;
capturing one or more images of at least a portion of the structured light pattern reflected from one or more objects in the local area; and
determining depth information for the one or more objects based at least in part on the captured one or more images.

16. The method of claim 15, further comprising:
controlling emission of the one or more pulses of light, based in part on the emission instructions; and
adjusting a position of the mounting element to position the DOE in accordance with the one or more pulses of light, based in part on the emission instructions.

17. The method of claim 15, further comprising:
dynamically adjusting a position of the mounting element, based in part on the determined depth information.

18. The method of claim 15, further comprising:
adjusting a position of the mounting element to translate the DOE along at least one dimension relative to the illumination source, based in part on the emission instructions.

19. The method of claim 15, further comprising:
obtaining information about a spatial resolution related to a pattern of the structured light; and
adjusting a position of the mounting element, based on the information about the spatial resolution.

20. A head-mounted display (HMD) comprising:
an electronic display configured to emit image light;
a structured light generator configured to illuminate a local area with structured light in accordance with emission instructions, the structured light generator comprising:
an illumination source configured to emit one or more pulses of light based in part on the emission instructions,
a mounting element configured to have a plurality of adjustable positions relative to the illumination source based in part on the emission instructions,
a diffractive optical element (DOE) mounted on the mounting element that generates diffracted scanning beams from the one or more pulses of light, the diffracted scanning beams having a different pattern for each position of the mounting element of the plurality of adjustable positions, and a projection assembly configured to project the diffracted scanning beams as the structured light into the local area, a pattern of the structured light being dynamically adjustable based in part on an adjustable position of the mounting element of the plurality of adjustable positions;

an imaging device configured to capture one or more images of at least a portion of the structured light reflected from one or more objects in the local area;

a controller configured to:
 generate the emission instructions,
 provide the emission instructions to the structured light generator, and
determine depth information for the one or more objects based in part on the captured one or more images; and
an optical assembly configured to direct the image light to an eye-box of the HMD corresponding to a location of a user's eye, the image light comprising the determined depth information.

\* \* \* \* \*